April 14, 1931. R. DE F. VINARDELL 1,800,419
APPARATUS FOR DISTRIBUTING COLORS AND FILLING MATERIALS
SERVING FOR THE MANUFACTURE OF FLAGSTONES
MADE OF CEMENT OR OTHER MATERIAL
Filed Jan. 7, 1930   2 Sheets-Sheet 1
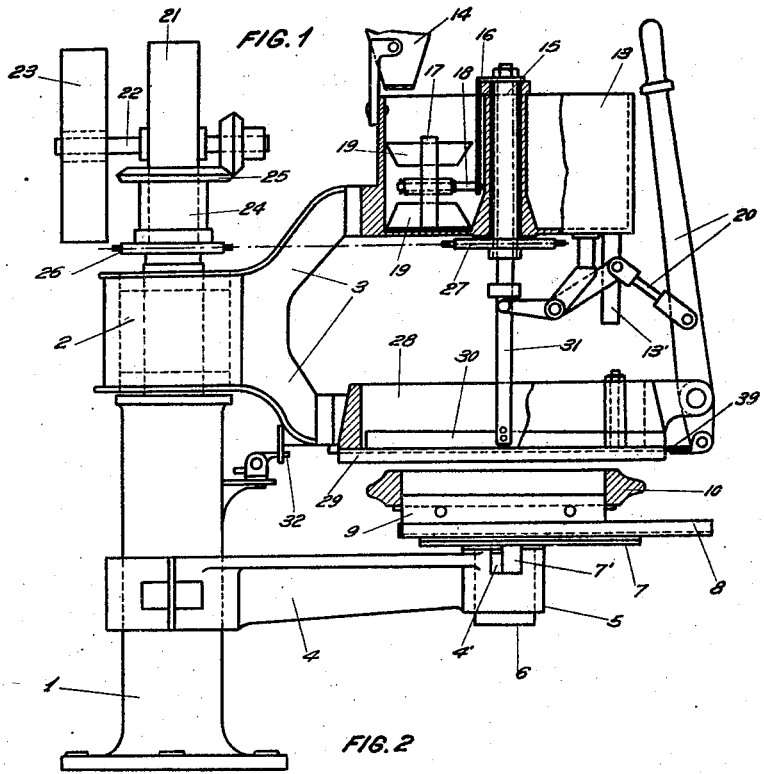
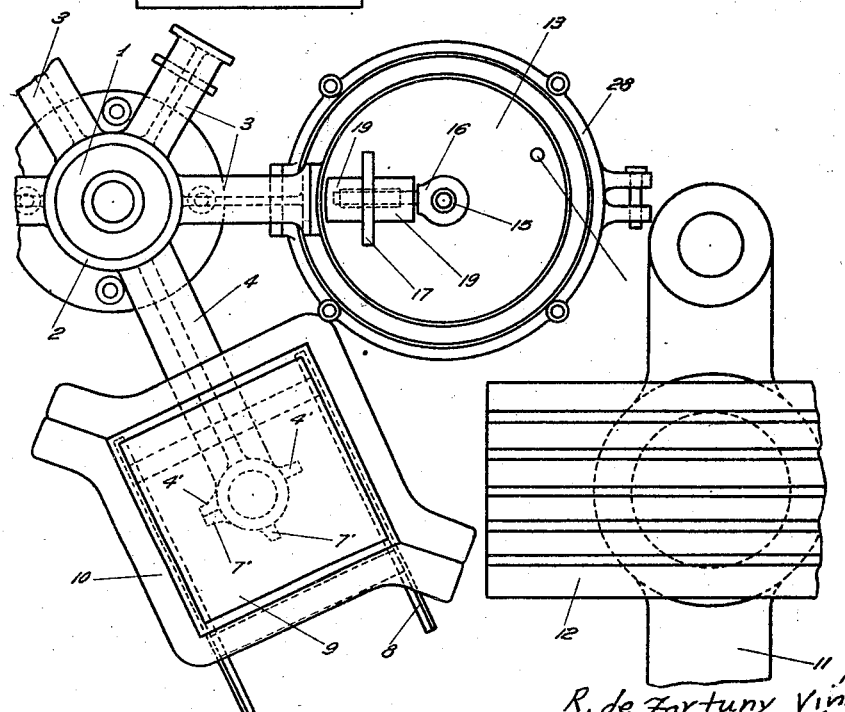
INVENTOR
R. de Fortuny Vinardell April 14, 1931.   R. DE F. VINARDELL   1,800,419
APPARATUS FOR DISTRIBUTING COLORS AND FILLING MATERIALS
SERVING FOR THE MANUFACTURE OF FLAGSTONES
MADE OF CEMENT OR OTHER MATERIAL
Filed Jan. 7, 1930   2 Sheets-Sheet 2

INVENTOR:
R. de Fortuny Vinardell

Patented Apr. 14, 1931

1,800,419

UNITED STATES PATENT OFFICE

RICHARD DE FORTUNY VINARDELL, OF BARCELONA, SPAIN

APPARATUS FOR DISTRIBUTING COLORS AND FILLING MATERIALS SERVING FOR THE MANUFACTURE OF FLAGSTONES MADE OF CEMENT OR OTHER MATERIAL

Application filed January 7, 1930, Serial No. 419,189, and in France January 16, 1929.

The present invention relates to improvements in processes for distributing the color in paste and filling materials employed in the manufacture of flag stones made of cement or of any other material forming what is called "hydraulic mosaic".

It is known that the manufacture comprises three series of primary operations consisting of the distribution of the coloring paste, according to the features of the design reproduced on the flagstones, filling with the material which had to form the flagstone, and pressing.

By means of the improvements according to the present invention, a particularly fortunate arrangement of the mechanical members carrying out the three series of operations mentioned above is obtained, the manufacture of the material being on this account considerably improved both from the point of view of the quality of the final product and from the point of view of cost.

Thus, according to the invention, the distribution of the colored paste is effected by a mechanical arrangement comprising as many groups of members as there are colors to be employed, each group comprising a reservoir in which the color is prepared. The latter then passes to a container arranged below it, with which the corresponding distributing member forms part. Each of the groups is mounted on a two-branched arm forming a sleeve which surrounds the fixed pillar, around which the arm turns. The pillar also comprises an arm carrying a platform and guiding supports for the model which serves for the manufacture of the plate.

By employing this apparatus and after having arranged the mould on the guiding elements and having placed it in a suitable position, the workman has only to make the group corresponding to each of the colors which enter into the composition of the decorative design, pass over the mould and to extract from each group the amount of color required. The permutation of the different colors is moreover considerably simplified by the fact that the arrangement formed by the groups mentioned above can turn around the pillar on which it is mounted. Moreover, the distance which separates the press from the device effecting the coloring is suitably chosen and in addition the guiding elements on which the mould rests during the introduction of the coloring materials may coincide with the plate of the press. In this way the mould can very easily be passed from the coloring device to the press.

The latter further comprises in a suitable manner reservoirs which distribute the cement and in general the material for filling the mould. On account of this arrangement the mould can be kept stationary during the distribution of the coloring materials and only moved in order to be conveyed to the press.

In addition the process permits plates to be obtained having a finish which cannot be obtained with apparatus at present employed. With the latter in fact a perfect definition of the lines composing the design is only obtained with great difficulty. Moreover the various operations which have been mentioned above succeed each other very rapidly and require a minimum effort which permits the production to be still further increased with respect to that obtained with the known processes and machines.

Another advantage resides in the fact that, by employing a single distributing plate for each of the colors, all the designs imaginable are obtained in any desired color. A considerable economy in the expense of machinery is consequently obtained because it is no longer necessary to have special distributing plates for each color and for each design, as has hitherto been the case.

By way of example only a form a construction of the machine or of the arrangement of apparatus serving for the above mentioned manufacture, and comprising the improvements above described, is illustrated in detail hereinafter. The drawings accompanying the description relate to the same form of construction.

In the drawings:

Figure 1 is an elevation of a pillar of the color reservoir and of the mould support, partly in section.

Figure 2 is a horizontal projection of the same machine and of a part of the press belonging to the same mechanical arrangement.

Figure 3:
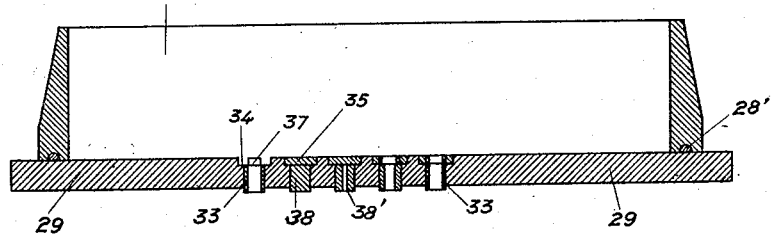
Figures 3 and 4 show to a larger scale a cross section and two different views in plan respectively of half of a color distributor.

The color distributing device comprises an equal number of groups of members to that of the colors which it is desired to obtain. The whole of these groups is disposed on a fixed pillar 1 which carries a sleeve 2, adapted to turn round the pillar on ball bearings. The collar 2 is extended by double radial arms 3 suitably spaced apart and equal in number to the number of groups of colors which the apparatus distributes.

The pillar is moreover rigid with an arm 4 the end of which forms a sleeve 5, in which is inserted the pivot 6 of a platform 7. The latter is provided with guide bars 8 on which is placed the mould formed by the plate 9 and the frame 10. The platform 7 can turn round the pivot 6 and thus describes an angle defined by the stops 4' on the arms 4 and the stops 7' on the platform. The angular displacement is precisely that which is suitable for one of the axes of the mould when it is arranged in such a way as to receive the different colors, to occupy a radial position with respect to the pillar 1 and for the mould to be then able to move into the corresponding position on the passage over the press 11. The latter is shown at the same time as the plate 12 in Figure 2. Each group of members intended for distributing a given color comprises a reservoir in which this coloring material is prepared and mixed, and a distributing container. The first reservoir, indicated at 13, is carried by the upper branch of the corresponding arm 3. It is circular and carries at its apex a hopper 14 which serves for the introduction in a suitable manner of the products entering into the composition of the coloring material. It is further provided with an apparatus for introducing the necessary water for the preparation of the color. The hopper in question will comprise as many mechanical elements as are necessary for facilitating the passage of the materials to the reservoir 13, the central part of which is traversed by a vertical shaft 15 given a movement of rotation which will be described hereinafter. The shaft 15 carries at its upper end an arm 16 serving as a support for a mixing device which is composed of a disc 17 mounted on a horizontal shaft 18 rigid with the arm 16. When the shaft 15 turns and drives the arm 16 and the disc 17, the latter commences to turn round the shaft 18 and rubs against the base of the reservoir 13. Blades 19 of suitable shape secured to the disc 17 act on the various coloring materials during this double movement of rotation and mix them.

The reservoir 13 is moreover pierced at its base with an outlet aperture 13' closed by a valve of suitable type actuated by means of a system of levers 20. The coloring material leaves the reservoir 13 at a suitable moment in order to be poured into the corresponding distributing device.

In order to operate the shafts 15 of the different reservoirs 13, a shaft is provided at 22 which is journalled in the support 21 provided at the top of the pillar. This shaft is driven from a motor through a pulley 23 or from any source of energy. It transmits the drive on its part to a vertical shaft 24 by means of an arrangement of bevel gears 25, the driven wheel of this arrangement being connected to a chain wheel 26, to a grooved pulley or to any other member of the same type serving for transmitting the movement to the shaft 15. The latter in its turn carries a wheel, a pulley or analogous driven element 27 which has been chosen for this purpose.

In order to prevent the mixer 17—19 from attaining an excessive speed during the rotation of this arrangement of mechanisms round the pillar 1, a loose pinion device or analogous arrangement may be added to the wheel 26 to govern the speed of the mixer. The distributing container forming a part of the same arm. The base of the frame is the colors, is composed of a fixed frame 28 secured to the lower branch of the corresponding arm 3 exactly below the reservoir 13 which is integral with the upper branch of the same arm. The base of the frame is closed by a plate 29 forming the distributing element proper. A stirring member formed by a rod 30 assembled to a shaft 31 suitably engaged in the above mentioned shaft 15 and adapted to slide along this shaft, rubs on this plate. The system of levers 20 described above serves for imparting this sliding movement. In this way the stirrer is detached from the base of the container when the distributor is opened, to lead the color it is desired to employ to the mould as will be described hereinafter, and is prevented from interfering with the flow of the material. Moreover in order to fix each of the said groups in the correct position, they have to occupy above the mould when the groups turn round the pillar, each of them is provided with a fixing member 32 suitably secured to a projection on the pillar 1, and operated by means of a lever or pedal device which is not here described since it may be constructed in very different ways.

Figure 4:
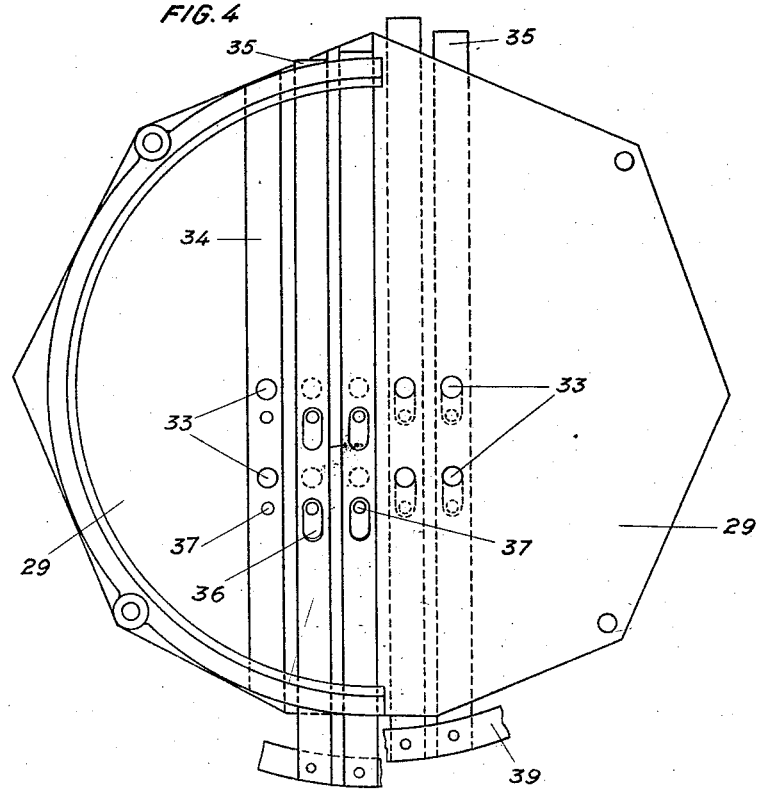

The plate 29 (Figures 3 and 4) which forms the color distributor proper, comprises a series of apertures 33 having a circular or other form and distributed over the whole surface of the plate so as to form for example checkering, but in all cases disposed along parallel straight lines. At its upper part the plate comprises grooves 34 the direction of which coincides with that of the axis along which the apertures are pierced. In the interior of each groove slides a rod 35 adapted to move in a longitudinal direction and pierced with oblong apertures 36 equal in number to the apertures pierced in the grooves 34. At their ends the rods 35 lodged in the grooves 34 pass through a circular frame 28 mounted on the plate 29. This frame is made of rubber or analogous material so as to provide a fluid tight joint between the frame and the plate and prevent the covering material from running off the plate. Each of the apertures in the grooves 34 contains a head 37 which penetrates into the corresponding oblong aperture 36 in the rod 35, the said apertures having their edges bevelled at one end. At the moment of the displacement of the rod 35 there is no danger of the coloring material accumulated in the apertures producing any obstacle therein, because this material can easily be removed on account of the arrangement of the head 37 and the bevelled edge mentioned above.

The case in which the coloring paste has to issue at the same time from all the apertures 33 in the plate 29 only occurs when the flagstone comprises no design; normally only a few of the apertures will be employed. Moreover solid pins 38 are introduced into those of the apertures which do not require to deliver the color and the amount of color delivered from the other orifices is regulated by employing members such as 38′ engaged in these orifices and pierced with an axial aperture of suitable dimensions. In this way it will be possible to regulate the amount of coloring material issuing at determined points on each plate in accordance with the designs it is desired to obtain.

For the purpose of operation the rods 35 are connected at one of their ends to a sector 39 pivoted to the lever 20 mentioned above. It is moreover obvious that if none of the apertures 32 in one of the rods 35 has to allow the color to pass, this rod will not be connected to the sector. The operation is in this case simplified and unnecessary friction avoided.

Figure 5:
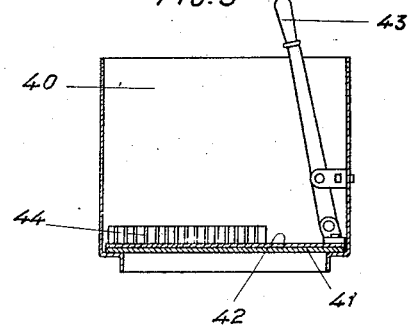
Figure 5 shows in detail one of the reservoirs for holding the filling material.

Figure 5 illustrates, as stated above, the reservoir which contains the filling material. This reservoir 40 has usually a rectangular or other section and is suitably secured either to the top point or to one of the pillars of the press 11.

The reservoirs of this type will always be arranged on a movable support having a shape which permits each of them to be displaced upon the mould for the purpose of filling, and the reservoirs to be then arranged in such a way that they will not be in the way during the operation. No details will be given in the following regarding the arrangement of the reservoirs and their supports, which are essentially varying elements as also are the type and model of press adopted upon which the said elements moreover depend. The base of the reservoirs 40 is formed of two panels 41, 42 pierced with apertures and having suitable dimensions for the material treated; or by two pieces of metal cloth, only the lower one of which is fixed and the upper one of which can be slightly displaced by means of a lever 43. By operating this lever rapidly and a number of times the cement or the material replacing it is made to issue in the desired quantities. A system of vertical blades 44 is arranged on the plate 42 and forms a checkering or other structure of the same type; the blades subdivide the material poured into the reservoir and partly retain it. They thus prevent it from being carried away or accumulating and consequently facilitate its ejection and distribution.

The machine described above works in the following manner:

When the operator has suitably positioned himself in front of the moulds 9, 10 and the guides 8 occupy the position shown in Figure 2, which corresponds to the admission of the coloring paste into the mould, the distribution of the colors is proceeded with. For this purpose the operator turns the whole arrangement composed of the sleeve 2 and the arm 3 and the reservoirs 13 and 28, until the first group or distributing reservoir becomes placed above the mould, the fixing member 32 holding it stationary in its correct position. By then acting on the lever 20 the material of the color it is desired to obtain is allowed to issue and the operation is repeated as many times as there are colors in the design to be reproduced. The mould and the guides 8 are then made to turn until they coincide with the table 12 of the press 11. When the locking member has been withdrawn, the pivoted support of the corresponding reservoir 40 is acted upon until the latter takes up its position on the mould and the necessary filling material is introduced by means of the lever 43. This operation is repeated on the second reservoir 40 and the operation is continued in this way until the mould is completely filled. The filling having been completed in the above described manner, the mould can be covered and the pressing proceeded with. When the flagstone has been formed it may be subjected to operations which complete the manufacture and which do not form the subject of the present specification.

As stated above the particular form in which the machine has been described is an embodiment which has been chosen arbitrarily as a constructional example. Without limiting the invention in any way all modifications which may be considered of use may be made, for example a choice may be made between a press operated mechanically and a hydraulic press, the number of arms forming part of the device distributing the colors, or the raw material from which any of the elements are made.

Similarly modifications may be made in the form and in the dimensions of the flagstones made on this machine, in the materials which enter into the composition of the flagstones and in general in any part which is not essential to the invention covered by the present specification.

What I claim is:

1. Apparatus for distributing colors and filling materials in the manufacture of flagstones and the like, made from cement and analogous materials, comprising a fixed pillar, an arm on the pillar carrying a platform, and a mould slidable and adjustable on guiding supports on the platform, a sleeve rotatable on the pillar above the said arm and carrying a plurality of radial arms each forming two superposed branches, the upper branch carrying a color reservoir and the lower branch carrying a distributing device whereby the color is received from the reservoir and distributed into the mould.

2. Apparatus for distributing colors and filling materials in the manufacture of flagstones and the like, made from cement and analogous materials, comprising a fixed pillar, an arm on the pillar carrying a platform, and a mould slidable and adjustable on guiding supports on the platform, a sleeve rotatable on the pillar above the said arm and carrying a plurality of radial arms each forming two superposed branches, the upper branch carrying a color reservoir and the lower branch carrying a distributing device whereby the color is received from the reservoir and distributed into the mould, and a press arranged at a suitable distance from the pillar.

3. Apparatus for distributing colors and filling materials in the manufacture of flagstones and the like, made from cement and analogous materials, comprising a fixed pillar, an arm on the pillar carrying a platform, and a mould slidable and adjustable on guiding supports on the platform, a sleeve rotatable on the pillar above the said arm and carrying a plurality of radial arms each forming two superposed branches, the upper branch carrying a color reservoir and the lower branch carrying a distributing device whereby the color is received from the reservoir and distributed into the mould, a press arranged at a suitable distance from the pillar, the platform being mounted on a pivot and turnable through a determined angle whereby the mould can be brought into a position such that it has one axis radial to the pillar, for filling, and another position in which it can slide along the said guides on to the press.

4. Apparatus for distributing colors and filling materials in the manufacture of flagstones and the like made from cement and analogous materials, as claimed in claim 1, the distributor comprising a frame and a base plate on the frame with distributing means in the base plate.

5. Apparatus for distributing colors and filling materials in the manufacture of flagstones and the like made from cement and analogous materials, as claimed in claim 1, the distributor comprising a frame provided with a base plate having a series of parallel grooves in its upper surface and apertures in each groove through the plate, and a rod adjustably guided in each groove and formed with a corresponding series of oblong apertures whereby the apertures in the plate can be opened or closed.

6. Apparatus for distributing colors and filling materials in the manufacture of flagstones and the like made from cement and analogous materials according to claim 1, each color reservoir comprising at the centre a vertical shaft given a movement of rotation and carrying on its upper part an arm of suitable form which penetrates into the material in the reservoir and integral with a horizontal shaft carrying a disc provided with blades or fins, the disc being mounted to turn round the horizontal shaft which rubs against the wall of the base of the reservoir, in such a way that during the rotation of the vertical shaft the disc can turn in one direction or the other on account of the friction.

7. Apparatus for distributing colors and filling materials in the manufacture of flagstones and the like made from cement and analogous materials, comprising a pillar, a bracket on the pillar having at its free end a pivot, a platform carried on the pivot and a mould slidable and adjustable on guiding supports on the platform, a sleeve rotatable on the pillar above the bracket and carrying a plurality of radial arms each forming two superposed branches, the upper branch carrying a color reservoir having an outlet and provided with color mixing means, and the lower branch carrying below the reservoir a distributor formed by a frame provided with a base plate having a series of parallel grooves in its upper surface and appertures in each groove through the plate, and a rod adjustably guided in each groove and formed with a corresponding series of oblong apertures whereby the apertures in the plate can be opened or closed.

8. Apparatus for distributing colors and filling materials in the manufacture of flagstones and the like made from cement and analogous materials according to claim 7, further comprising pins engaged in the apertures in the said plates, the pins being solid or having an axial perforation of varying size, whereby the distributing effect of a line of apertures is varied.

9. Apparatus for distributing colors and filling materials in the manufacture of flagstones and the like made from cement and analogous materials, according to claim 7, further comprising a lever connected through a sector to one end of the rods whereby the rods are adjusted simultaneously in the grooves.

10. Apparatus for distributing colors and filling materials in the manufacture of flagstones and the like made from cement and analogous materials, according to claim 7, further comprising solid blocks being engaged in those of the apertures in the plate through which no delivery is to be effected.

11. Apparatus for distributing colors and filling materials in the manufacture of flagstones and the like made from cement and analogous materials, according to claim 7, the apertures in the plate being fitted with hollow sleeves of internal diameter varying as desired.

12. Apparatus for distributing colors and filling materials in the manufacture of flagstones and the like made from cement and analogous materials according to claim 7, each color reservoir comprising at the centre a vertical shaft given a movement of rotation and carrying on its upper part an arm of suitable form which penetrates into the material in the reservoir and integral with a horizontal shaft carrying a disc provided with blades or fins, the disc being mounted to turn round the horizontal shaft which rubs against the wall of the base of the reservoir, in such a way that during the rotation of the vertical shaft the disc can turn in one direction or the other on account of the friction.

13. Apparatus for distributing colors and filling materials in the manufacture of flagstones and the like made from cement and analogous materials according to claim 7, each color reservoir comprising at the centre a vertical shaft given a movement of rotation and carrying on its upper part an arm of suitable form which penetrates into the material in the reservoir and integral with a horizontal shaft carrying a disc provided with blades or fins, the disc being mounted to turn round the horizontal shaft which rubs against the wall of the base of the reservoir, in such a way that during the rotation of the vertical shaft the disc can turn in one direction or the other on account of the friction, the distributor comprising a vertical shaft axially slidable in the vertical shaft of the reservoir and carrying at its lower end a radial stirring rod rubbing on the said base plate, and means for raising the slidable shaft and the stirrer when the color is poured out.

In testimony whereof I have signed my name to this specification.

RICHARD de FORTUNY VINARDELL.